United States Patent Office 3,289,694
Patented Dec. 6, 1966

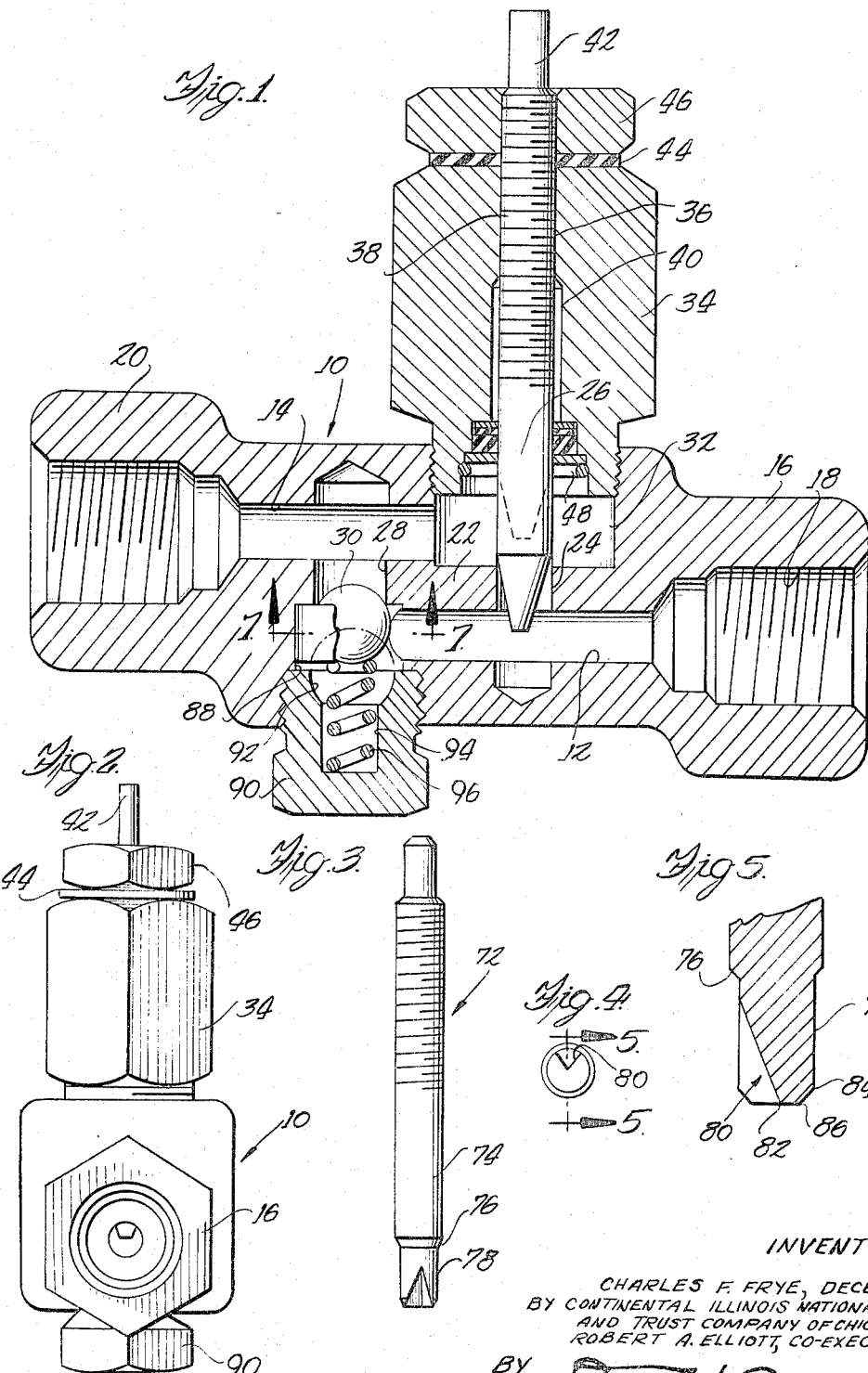

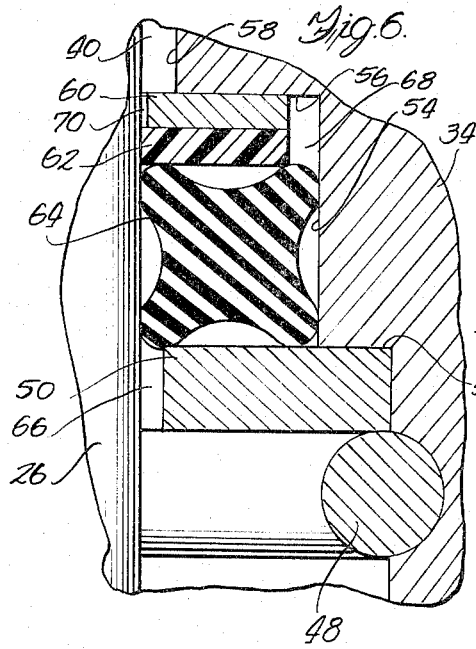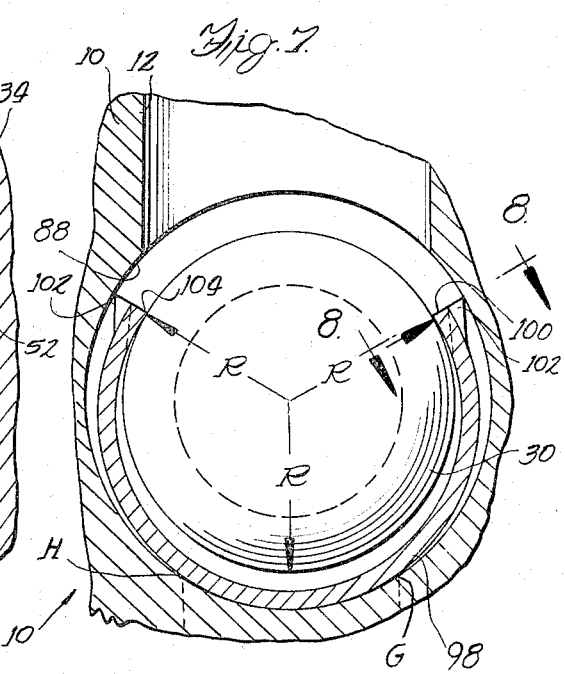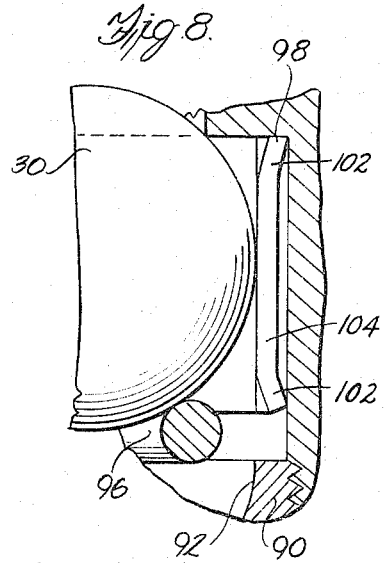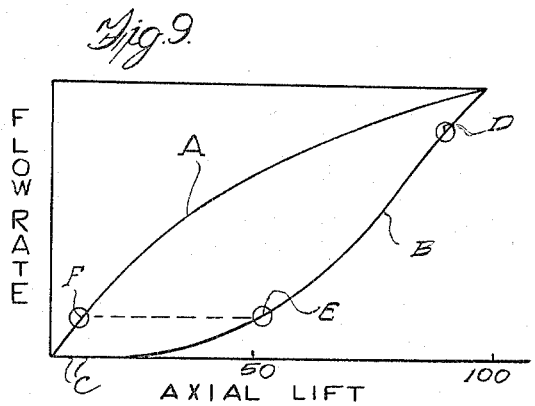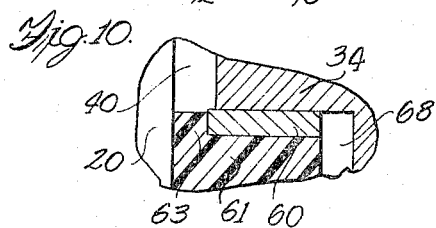

3,289,694
BALL CHECK VALVE WITH PARTICULAR CAGE MEANS
Charles F. Frye, deceased, late of Bellwood, Ill., by Robert A. Elliott, executor, Glen Ellyn, Ill., and The Continental Illinois Bank and Trust Co., executor, Chicago, Ill., assignors to Deltrol Corp., Bellwood, Ill., a corporation of Delaware
Filed Mar. 27, 1963, Ser. No. 268,433
5 Claims. (Cl. 137—533.13)

The invention relates to control valves for regulating fluid flow and includes among its objects and advantages, extremely rapid flow with minimum pressure drop when desired; slower flow calibrated with high precision; and adjustment of calibrated flow at extremely high pressures entirely without leakage and substantially without binding action in the adjustment means due to the high pressure. Further objects and advantages will become apparent as the description proceeds.

In the accompanying drawings:
FIGURE 1 is a sectional view of the complete valve unit according to the invention;
FIGURE 2 is an end elevation looking from the right end of FIGURE 1;
FIGURE 3 is an elevation of a modified calibrating needle;
FIGURE 4 is an end elevation of the same needle;
FIGURE 5 is a fragmentary section as on line 5—5 of FIGURE 4;
FIGURE 6 is a greatly enlarged section of the packing for the floating needle valve;
FIGURE 7 is an enlarged section as on line 7—7 of FIGURE 1;
FIGURE 8 is a detail section on line 8—8 of FIGURE 7;
FIGURE 9 is a flow rate diagram; and
FIGURE 10 is a detail of a modified washer.

In the embodiment selected to illustrate the invention, the main body of the valve assembly is a forging defining a central body 10 with rounded edges and corners. In the position of FIGURES 1 and 2, the body has a lower bore 12, and an upper bore 14. For purposes of identification, the inlet is the passage 12 receiving fluid in the direction that closes the ball check valve, and passage 14 is the outlet. These designations are reversible, depending on the nature of the complete installation. The inlet is continued beyond the main body 10 in a hexagonal boss 16 coaxial with the bore 12 and the bore has stepped enlargements ending in an internally screw threaded outer end portion at 18 adapted to be connected to a supply or delivery pipe. The outlet 14 is continued in a boss 20, which duplicates the boss 16, except that it is offset upwardly instead of downwardly with respect to the body 10.

The bores 14 and 12 are offset far enough to leave a partition, or septum, 22 between them. Through this septum, two cross bores are provided. The small cross bore 24 cooperates with a needle valve 26 for securing accurately calibrated throttled flow upwardly through the bore 24. The larger cross bore 28 cooperates with the spring pressed ball 30 in permitting free and unobstructed downward flow when the pressure difference is in that direction, and permitting no flow at all when the pressure is in the opposite direction, whereby the date of flow is determined by the needle valve 26.

This basic relationship has been well-known in the art for a long time and is illustrated, for instance, in an earlier Frye Patent 2,841,174 of July 1, 1959.

The bore 24 opens into a chamber 32 which receives the threaded lower end of the block 34. This block closes the top of the chamber and houses the needle valve 26 and its packing.

The block 34 has threaded engagement at 36 for a short distance along the threaded portion 38 of the needle valve 26 and is then enlarged to define a chamber 40 encircling the needle valve above the packing. The threads for mounting the block 34 on the body 10 are machined with tolerances that are minimum for quantity production operations, but no available precision in this respect can prevent deviations such that the geometrical axis of the bore 24 will often be two thousandths of an inch or so offset from the geometrical axis of the threads 36. When this is the case, every time the needle valve is closed, the final closing movement would, theoretically, flex the needle 26 between its threaded engagement with the block 34, and its seat in the bore 24. This introduces serious mechanical stresses and strains in the metal and serious wear on the valve seat and the threads.

In the particular embodiment illustrated, a relatively loose, No. 2 female thread in the block 34 and a corresponding thread on the pin 26, permits the tip of the needle valve to wobble materially without flexure of the valve stem. Because the threads 36 are short, and the valve seat is separated from the threads by a long space, this wobble is magnified correspondingly. Accordingly, the expense of high precision tight threads at 36 and abnormal stresses and strains in the parts are both eliminated. The commercial designation for the type of thread that happens to fulfill this condition in the embodiment disclosed is the No. 2 thread.

Many prior art packings for effecting the necessary seal in the block 34, not only grip the surface of the needle 26 with rather heavy friction, but they come close to preventing the wobble above described, that is needed to allow for a free seat in the bore 24. They also rarely fail to permit extremely minute leakage up into the chamber 40 when exposed to pressures of the order of magnitude of 5000 p.s.i. for long periods of time. When a condition is reached with the chamber 40 full of liquid, movement of the needle valve 26 in the direction of opening requires the male threads on the needle valve to move up into the female threads in the block 34 and to be replaced at the bottom end with an equal length of the pin 26 of full cross section. This reduces the volume of the chamber 40 by the volume of metal removed from the pin in forming the screw threads. Small as this reduction is, when it has to be made with the chamber 40 already filled with incompressible liquid at 5000 p.s.i., and especially when the threads 36 are of the tight precision fit customarily employed in such heavy duty installations, turning of the pin 26 in the direction of opening can be accomplished only by extruding part of the contents of the chamber 40 back through the packing in the opposite direction. Assuming that the normal working pressure was 5000 p.s.i., if the opening movement is abrupt, the momentary pressure in the chamber 40 may easily rise to some such value as 25,000 p.s.i. The pressure reversal on the packing and the momentary abnormally high pressure injures the packing, and the mechanical force that must be applied to the polygonal end 42 to accomplish the displacement becomes surprisingly large. An operator with previous experience may succeed in making the adjustments with a powerful wrench by exerting a steady pull that rotates the stem slowly at the rate of about 30 seconds for 180° of rotation, without twisting the end 42 off the needle.

The conventional friction washer 44 and lock nut 46 perform their conventional functions independent of the problems now under discussion.

Referring now to FIGURE 6, the pin 26 passes through a packing held in position by a retaining ring 48 snapped into a semi-circular groove in the block 34. The next packing element is a metallic washer 50 clamped against axial movement between the snap ring 48 and a shoulder 52. This ring is not locked against rotation but there are no forces tending to rotate it. Above the shoulder 52 the block 34 has a bore of intermediate diameter at 54 ending at a second shoulder 56 which extends into the final bore 58 defining the outer wall of the chamber 40.

In the central bore 54, there is at the top a metallic washer 60 and below that a plastic washer 62 and below that a neoprene quad ring 64. These three elements substantially fill the chamber, with the quad ring definitely in contact with the bottom washer 50 but not materially distorted.

It will be noted that the bottom washer 50 has a substantial clearance at 66 between its inner surface and the pin 26. This permits relative radial movement so that the pin 26 can have the wobble previously described. At the top, the metal washer 60 is a free fit on the pin 26 to prevent marring and has a clearance at 68 between its outer surface and the bore 54, of substantially the same radial extent as the clearance 66. The plastic washer 62 is a snug fit on the pin 26 and its outer diameter is the same as that for the metal washer 60. It will be apparent that the full liquid pressure will obtain in the clearance at 66 and that when this pressure is very high the quad ring 64 may be compressed upwardly. The resulting distortion may reduce the clearance spaces on the low pressure side of the quad ring especially with respect to the clearance at 68.

In practice, such a packing as that just described will function very well up to about 1500 p.s.i., without the nylon washer 62. At higher pressures a tendency develops to extrude the neoprene into the joint between the washer 60 and the pin 26. After a substantial portion of the neoprene has been transferred in that way into the chamber 40 the packing is ruined. With the neoprene washer 62 in place, various and repeated adjustments of the pin at 5,000 p.s.i. or higher, still result in no marring of pin 26 or leakage into the chamber 40. I believe this to be due to the value for the coefficient of friction between the neoprene of the quad ring 64 and another surface also of plastic, neoprene washer 62, compared with the friction between neoprene and metal. Whatever the reason may be, the presence of the plastic washer 62 next to the plastic ring 64 accomplishes a surprising increase in the working pressures that can be successfully handled.

Except in very small sizes, it is preferred to prevent the washer 60 from even engaging the pin 26 at all. In FIGURE 10 the modified nylon washer 61 has a short nipple 63 and there is no sliding movement between the washers 60 and 61. Washer 60 and shoulder 56 carry the mechanical load, but the high pressure never gets into the space at 68.

In miscellaneous installations, especially for automation, one of the commonest assemblies for such a valve is with working cylinder connected to the outlet 14, and other valve means for connecting the inlet 12 alternately to a source of high pressure fluid and to atmosphere, or a return line to a storage reservoir.

It will be obvious that the working stroke with fluid entering the inlet 12 can be throttled down by the needle 26 so that the working stroke may cover a period of time from 5 to 500 or even 5,000 times the time it takes for the return stroke to take place with the ball 30 wide open and both passages 14 and 12 directly connected to atmosphere. Under such circumstances, the short time for the return becomes relatively immaterial, so far as precise adjustment is concerned, and all that is needed is to get the piston back ready to start the next working stroke. But rather precise adjustment of the working stroke is often required to move a work piece at the proper speed or merely to prevent getting the parts that are being moved to their final position without accelerating them to such high velocities that they injure something at the end of their movement.

Referring now to FIGURES 1, 3 and 9, it will be apparent that axial withdrawal of the needle 26 will open a net area through the passage 24 equal to the difference between the area of the passage and the area of the valve 26. This rate of increase will be greatest when the valve is first cracked open and will decrease materially so that the actual flow increases at a slower rate during the later stages of the opening movement than during the early stages. In FIGURE 9 I have indicated the amount of valve opening on the horizontal or X axis and the flow rate on the vertical or the Y axis and the shape of the curve A is typical of the effective response of such a valve when used for throttling. It will be apparent that above the 20 or 30 percent opening, there is a relatively high sensitivity and relative adjustments can be made by the operator, but close to the closed position, where it is often necessary for the equipment to operate, the sensitivity is low and the rate of response undesirably high.

In the alternative construction of FIGURE 3 the threaded portion and top of the needle 72 may be identical with the needle 26 of FIGURE 1. The cylindrical portion 74 of full diameter also duplicates the corresponding portion of the pin 26. Below the portion 74 there is first, a short conical portion 76 adapted to engage the lip of the valve seat when the valve is completely closed. Below the conical portion 76, cylindrical portion 78 extends down as indicated in FIGURES 3 and 5. This portion is only from 0.0005" to 0.00025" smaller than the bore 24. A short upper portion of the obturator 78, next the conical portion 76 is of circular contour. Below that, I fashion a diagonal V-shaped groove 80 that has its side faces in the same plane throughout its length, but its apex, or crotch, is inclined inward diagonally. The extreme bottom end of the obturator is flat at 82, and when the groove 80 reaches the axis of the pin the slot leaves open approximately one-sixth of the area of the end portion 82.

As the needle of the FIGURES 3, 4, and 5 moves up, the initial separation of the cone 76 from the valve seat will permit only a very trifling leakage between the obturator 78 and the bore, until the upper end of the groove 80 is reached. Thereafter, the groove increases relatively slowly at first, but more rapidly as the groove itself becomes larger. Finally, when the corner at 84 is above the level of the bore, it lets the conical tip portion 86 start opening a much wider diagonal clearance between the needle and the lip of the bore.

In FIGURE 9 the curve B is intended to indicate the type of movement of fluid that can be obtained with a needle according to FIGURE 3. Up to some such point as C there is only leakage around the obturator 78. Then the groove 80 produces the result indicated by the curve B up to some such point as D, at which time the area of flow begins to be defined by the lip of bore 24 and the face of the cone 86. It will be noted that the flow rate corresponding to the point E on curve B is also obtainable at the point F on curve A, but that the valve displacement to get exactly that rate of flow is about 10 times as great with needle 74.

*Long life, wide opening check valve*

Referring to FIGURES 1, 7, and 8, the ball 30 reciprocates in a vertical bore 88 coaxial with the bore 28. The bore 88 is closed by a threaded plug 90 having a spherical open portion 92 adapted to receive part of the ball 30 with a relatively close fit as can be seen in FIG. 1, and a deeper central bore 94 housing a compression spring 96.

The movement of such a ball is often very rapid and forceful and many such valves must function smoothly for millions of openings and closings without wearing out. Accordingly, the guidance for the movement of the valve becomes a critical matter and it is also necessary to let the ball move down into the pocket 92 so that the path of the fluid from passage 14 to passage 12 is of substantially no greater flow resistance than these passages themselves. Otherwise, the valve structure itself would throttle down the flow and deprive the user of the maximum flow obtainable through passages 12 and 14 of any given size.

The bore 88 is materially larger than required to accommodate the movement of the ball 30 and the primary guidance of the ball 30 does not depend on the walls of the bore 88 but on the interior surface of a C-shaped sleeve 98 of a ribbon-like cross-section seated in the bore 88 at about the level of the passage 12. Referring especially to FIGURE 7, the base or portion opposite the open portion of the sleeve 98, in assembled condition, fits snugly against the circular wall of the bore 88 substantially directly opposite the mouth or port of the passage 12 over substantially 90° of the circumference of the sleeve 98, up to points indicated at H and G in FIGURE 7. The vertical edges 104 of the sleeve 98, which define its cutout portion, are essentially parallel to the axis of the bore 28 and are located on opposite sides of the mouth of the passage 12. The sleeve 98 is originally manufactured with a radius of curvature materially larger than that of the bore 88 and has to be strongly compressed to force it into assembled position. It would remain in perfectly snug contact with the bore 88 throughout its entire extent if the extreme edges 104 were not forced in at each corner by turning small triangular areas at the top and lower ends of those edges diagonally outward, as indicated at 102. These points 102 tend to gouge into the metal of the body 10 as the sleeve is pushed up into the position of FIGURE 8 and a quite heavy friction between the sleeve and the bore obtains over the entire periphery from point H to point G and also where the horns 102 ride on the bore, thus preventing the sleeve 98 from being displaced. Thus, at the upper and lower corners of each end edge, the material of the ring, or sleeve, is forced or flexed inward, so that the major portions of the edges 104 of the sleeve lie, as can be seen in FIGURES 7 and 8, well back from the mouth of the passage 12 and at substantially the same radial distance R from the axis of the bore 28 as the radius R of the ball 30. In FIGURE 7 the location of the seat is indicated in dotted lines, and it will be apparent that the ball, when seated, has continuous contact over the entire periphery of the seat and is also in substantially actual contact with the parallel guides formed by the edges 104.

During the rapid movement of fluids in through outlet passage 14, and out through the passage 12, the impact of the fluid coming through passage 28 moves the ball 30 against the spring 96 all the way down into the pocket 92. When the ball 30 is fully in the pocket 92, as can be seen in FIG. 1, the top of the ball is about at the midpoint, vertically, of the passage 12.

Referring to FIGURE 7, it will be noticed that the passage between the edges 104 of the liner 98 has a width equal to the diameter of the passage 12, so that there is no constriction of the flow out into the passage 12. The embodiment of the invention shown herein has an especially effective flow pattern and it is believed, although not experimentally confirmed, that fluid coming in through passage 14 encounters a body of stationary fluid in a dead space at the right side of the passage 28 and is pushed down diagonally into the end of the passage 12 with minimum turbulence and substantially no throttling action. The ball occupies the dotted line position indicated in FIGURE 1 during flow from the passage 14 to the passage 12. This is the flow condition when a power cylinder is being vented to atmosphere, and at such times the action of the valve cannot be too rapid.

The mere cessation of flow to the right ends the dynamic action that holds the ball down, and the ball will get back up to the full line position at substantially the instant that the flow ceases. As flow to the right diminishes, the spring 96 is able to push the ball 30 toward its seat so that the ball is on or very near its seat when the flow finally ceases. The subsequent very rapid rise of the pressure in passage 12 up to full line pressure, anchors the ball firmly on its seat, and the needle valve 26 will govern the rate at which the power stroke is completed.

The sleeve 98 with the edges 104 flexed inwardly is instrumental in providing an effective action. As can be seen in FIGS. 1, 7 and 8, the sleeve 98 provides a portion of reduced diameter in the bore 88 at about the level of the passage 12 which portion extends upwardly to the seat formed by the mouth or lip of the bore 28. The ball 30 must of course pass through this portion as it moves to and away from the seat. The diameter of the ball 30 is larger than the cutout portion of the sleeve 98, the distance between the edges 104. Since the edges 104 are radially spaced from the axis of the bore 28 distances equal to the radius of the ball 30, the ball 30 cannot move closer to the passage 12 than the position shown in FIG. 7 at which time the ball 30 is directly in line with its seat. Thus, the edges 104 constitute parallel guide rails for the ball 30 which prevent it from ever moving out of alignment with the seat in the direction toward the port of the passage 12. The ball 30 contacts the rails or edges 104 at its equator and, as can be seen from FIGS. 1 and 8, the height of the sleeve 98 is sufficient so that guidance is had from the point where the ball 30 is seated to a point where it is almost in the pocket 92.

The edges 104 also serve to hold the ball 30 at all times at a substantial distance from the mouth of the passage 12 as the ball 30 passes thereby in its travel between its seat and the pocket 92. This prevents the ball 30 from being pushed or sucked into a blocking position over the mouth of the passage 12 when there is a flow from the passage 14 to the passage 12. Also, the ball cannot impede the flow from the passage 12 which occurs at the beginning of a power stroke and seats the ball 30. That is, there is room for a substantial flow around the underside of the ball 30, which is already on or near its seat when flow begins, to push it up on its seat.

There must of course be some clearance for the ball 30 in the sleeve 98, and the ball 30 can move out of alignment with its seat in a direction away from the passage 12, downwardly as seen in FIG. 7. This clearance can be minimal, however, so that even if the ball 30 is moved downwardly to the base of the sleeve 98 as seen in FIG. 7, for example in response to a flow outwardly from the passage 12, it is not out of alignment enough to cause serious damage upon seating.

The inward flexing of the edges 104 caused by the presence of the ears 102 causes, in essence, the sleeve 98 to form a bore portion the axis of which is, with respect to the axis of the bore 28, offset in a direction substantially directly away from the passage 12. This flexing-in and the resulting offset are instrumental in providing a sleeve which can hold the ball 30 sufficiently away from the passage 12, while allowing sufficient clearance and avoiding any blockage of the passage 12. That is, if the edges 104 were unflexed and against the walls of the bore 88, with the sleeve remaining of the same thickness, it is obvious that the ball 30 could move much closer to the passage 12. This could be prevented to some degree by extending the edges 104 partially over the mouth of the passage 12, but this would reduce the area of the passage 12 and would create turbulence pockets which could further reduce flow through the passage 12. With the flexed edges 104, the ends can be on either side of the passage 12 so that the sleeve 98 is cut away over the entire area of the passage 12. The ball 30 could be held back from the passage 12 without having the edges 104 extend over the passage 12 and without flexing if the thickness of the sleeve 98 were increased. As can be seen from FIG. 7, however, to hold the ball 30 in the position of FIG. 7 would require an unflexed sleeve of a thickness equal to the space between the ball 30 and the bore 88, eliminating the necessary clearance.

The ears 102 can be formed simply and serve as one very efficient way of causing the desired flexing-in of the edges 104. As stated, they also serve to prevent displacement of the sleeve 98.

The pocket 92 is also of importance in providing improved operation. It has been found that a valve such as this functions most effectively when the ball 30 can move substantially past the port of the passage 12 so that, at its lowermost position, it extends upwardly no further than to the vertical midpoint of the passage 12, at which position downward flow is over one quadrant of the ball 30. Further downward movement of the ball may increase the possible area of flow slightly, but any resulting gain is offset by an accompanying increase in closing time since the ball has further to go to reach its seat. The pocket 92, as can be seen in FIG. 1, definitely establishes a lowermost position for the ball 30 in which the top of the ball 30 is at about the midpoint of the passage 12, the best compromise position. Further, the fact that the ball 30 has a relatively tight fit in the pocket 92 prevents or reduces to a minimum any flow from the passage 14 about the bottom of the ball 30 which might tend to lift it from the pocket 92.

Others may readily adapt the invention for use under various conditions of service by employing one or more of the novel features disclosed, or equivalents thereof. In FIGURES 7 and 8, I have shown turned out corners 102 at both ends of the guides 104. With valves of large size, for operating on gaseous media with frequent, rapid opening and closing, the omission of the remote turned out corners, those fartherest from the seat, lets the ball edge over a few thousandths of an inch toward the mouth of the passage 12 when it is near the bottom point of its travel, as seen in FIG. 1, since the omitted corners will cause the edges 104 to converge toward the seat. The clearance from the passage 12 may still be enough, and proper seating will be insured since the edges 104 near the seat will still be spaced as in FIG. 7 so that there will be a funnel effect and the ball 30 will ride down the very slightly inclined guides against the stream in the bore 28, to a seating cushioned by the dying stream. With valves of large size, operating on liquid media, with very high pressures and relatively slow opening and closing velocities, omission of the turned out corners adjacent the valve seat can permit a twisting of the edges 104, generally clockwise as seen in FIG. 8, which results in a slightly reduced radial clearance, less than that shown in FIG. 7, between ball and sleeve when the ball is wide open, to the point where the ball will wedge in the sleeve when pushed down by flow from the passage 14 and if the wedging flexes the proximate guide ends open a half thousandth of an inch, the resilient force exerted by the flexed ends is ample to maintain the ball down without further help from the flowing fluid which prevents any power loss, while the increased clearance on the side next the debouching passage 12, caused by the fact that the twisting of the edges 104 moves their lower ends further inward from the passage 12 than these ends are in FIG. 7 avoids any initial delay in letting liquid refill the socket 92 when the ball starts to leave.

Data available to date seems to indicate that during tens of millions of operations, the seating impact of the ball tends to develop a peening of the metal of the seat, which can hardly be observed without a microscope.

But the peening will start opposite the passage 12 and develop a hair-thin scimitar having a true spherical concave surface, with its points opening toward the passage 12. This is apparently due to the fact that the only substantial movement and resulting misalignment allowed the ball 30 in the sleeve 98 is substantially directly away from the passage 12 so that the rear portion of the ball 30 is the only portion subject to any appreciable peening.

Because the impact of the stream is all that holds the ball away from its seat, the normal operation with a compressible fluid such as air, is to close the valve relatively slowly as the contents of the power cylinder connected to delivery passage 14 approach atmospheric pressure. At the other end of the cycle, when a high pressure in passage 12 is suddenly removed with almost explosive speed at the end of a power cycle, and the beginning of the exhaust stroke, the ball 30 may move fast enough to slap hard against the seat 92, but that impact is distributed over an area many times greater than that of the valve seat proper. The valve body may be of brass, bronze, or steel, but the steel ball should always have a surface hardness much greater than that of the other parts.

The foregoing explanation is tendered to clarify the multiple function of flexing in the ends of the liner. Because a service test in actual service, adequate to give a good demonstration of the peening action, is not likely to be available until after valves have been in use for ten or fifteen years, the description of the peening action is only a well-informed conjecture, but one of high probability.

As at present advised, with respect to the apparent scope of the invention, the following subject matter is claimed:

1. In a ball check valve, the combination comprising: a ball chamber defining a bore having an outwardly opening passage at one end, the inner lip of which passage defines a generally circular seat, and a line passage port opening laterally off one side; a ball of a diameter substantially smaller than the bore which is sealingly engageable with the seat and is movable within the bore between the seat and a position substantially past the port; and a guide member in the bore at the level of the port to define a bore portion of reduced diameter through which the ball passes as it moves past the port, said guide member being cut away over the entire area of the port and having a pair of edges defining its cutout portion which are generally parallel to the axis of the seat and are disposed on opposite sides of the port, which edges are flexed inwardly from the walls of the bore so that the bore portion formed by the guide member has its axis offset, with respect to the axis of the seat, in a direction substantially directly away from the port.

2. In a ball check valve, the combination comprising: a ball chamber defining a bore having an outwardly opening passage at one end, the inner lip of which passage defines a generally circular seat, and a line passage port opening laterally off one side; a ball of a diameter substantially smaller than the bore which is sealingly engageable with the seat and is movable within the bore between the seat and a position susbtantially past the port; and a C-shaped sleeve of a ribbon-like cross-section in the bore at the level of the port with its base against the wall of the bore directly opposite the port and its cutout portion facing the port, the edges of the sleeve which define the cutout portion being susbtantially parallel to the axis of the seat and disposed on opposite sides of the port to provide a pair of parallel guide edges, the diameter of the ball being greater than the distance between the guide edges, said sleeve defining a bore portion of reduced diameter through which the ball passes with minimum clearance as it moves past the port, the guide edges of the sleeve being flexed inwardly from the walls of the bore so that the bore portion formed by the sleeve has its axis offset, with respect to the axis of the seat, in a direction substantially directly away from the port.

3. The combination of claim 2 wherein the guide edges of the sleeve are spaced radially from the axis of the seat distances equal to the radius of the ball so that when the ball is resting on the guide edges it is aligned with the seat.

4. In a ball check valve, the combination comprising: a ball chamber defining a bore having an outwardly opening passage at one end, the inner lip of which passage defines a generally circular seat, and a line passage port opening laterally off one side; a ball of a diameter substantially smaller than the bore which is sealingly engageable with the seat and is movable within the bore between the seat and a position substantially past the port; and a sleeve of a ribbon-like cross-section formed in the shape of a C and disposed in the bore at the level of the port with its base against the wall of the bore opposite the port and the edges defining its cutout portion on opposite sides of the port to define a pair of guide edges which are generally parallel to the axis of the seat, at least one corner of each of said guide edges being bent radially outwardly so that the major portions of the guide edges are flexed inwardly whereby the sleeve defines a bore portion of a reduced diameter through which the ball passes with minimum clearance in its movement past the port, which portion has its axis offset, with respect to the axis of the seat, in a direction substantially directly away from the port, the major portions of the guide edges being spaced radially from the axis of the seat a distance approximately equal to the radius of the ball.

5. The combination of claim 4 wherein the end of the bore opposite the seat is provided with a generally spherical concave portion within which the ball is adapted to be seated with a relatively close fit at a position where the top of the ball projecting above the spherical portion is at approximately the midpoint of the port.

References Cited by the Examiner
UNITED STATES PATENTS

| | | | |
|---|---|---|---|
| 2,596,779 | 5/1952 | McCoy | 137—539 X |
| 2,841,174 | 7/1958 | Frye | 137—539 X |

ALAN COHAN, *Primary Examiner.*

I. WEIL, D. LAMBERT, *Assistant Examiners.*